United States Patent Office 3,148,200
Patented Sept. 8, 1964

3,148,200
METHOD FOR THE PREPARATION OF
CARBOXYLIC ACID ESTERS
Robert H. Mills, Webster Groves, Mo., and Oliver J. Weinkauff, deceased, late of St. Louis, Mo., by Ruth T. Weinkauff, executrix, St. Louis, Mo., assignors to Monsanto Company, a corporation of Delaware
No Drawing. Filed Dec. 29, 1961, Ser. No. 164,219
9 Claims. (Cl. 260—410.6)

This invention relates to a new process for preparing esters and, more particularly, to a new method for preparing alkanediol esters of organic carboxylic acids utilizing a dihaloalkane, an organic carboxylic acid and a tertiary amine.

Esters of carboxylic acids, particularly esters or arylene and alkylene polycarboxylic acids, have been widely used as synthetic lubricants and as plasticizers for synthetic resins, and principally as plasticizers for polyvinyl chloride. In general, such esters have been prepared by esterifying a carboxylic acid with an alcohol or diol in the presence of an esterification catalyst, preferably an acid esterification catalyst. An excess of alcohol or low boiling hydrocarbon, such as toluene, is employed to function as an entraining agent in removing water formed in the reaction. Although this method suffices in many situations, in the case of esterifying dihydroxy alcohol with carboxylic acids, different methods have been constantly sought due to the high cost of the diols which are normally used.

The use of a solvent, such as acetone, was found to be necessary in the preparation of phenacyl benzoate from phenacyl bromide and benzoic acid in the presence of triethylamine. Thus, in this alternate method, it is necessary to employ a solvent and an activated halide. An activated halide is one which contains either a strong electron-donating group adjacent to the halogen-containing carbon or one that contains an unsaturated grouping in such a position that a carbonium ion, formed by loss of a halide ion, is stabilized by resonance. If either of the above types of structure is present, the result is an increase in the ease of formation of the carbonium ion; that is, such a structure shows a marked labilizing effect when attached to the carbon holding the halogen. Examples of structures having a labilizing effect are the phenyl, carbonyl, carbethoxy, cyano, amido, methoxy, nitrophenyl, bromophenyl and chlorophenyl groups. Conversely an unactivated halide is one which does not contain either of the above conformations. A practical consideration is that dihaloalkanes, being unactivated, have not been successfully used in esterification reactions. Studies of the relative rates of reaction of "activated" and "unactivated" halides have been made, and examples of the results of such studies can be found in Gilman, Organic Chemistry (Vol. I) (2nd ed. 1943), page 1054. Thus it is therein shown, for example, that on the basis of n-butyl chloride (an alkyl halide) having a reaction rate of 1 with potassium iodide, the relative reaction rates of various activated halides are as follows:

| | |
|---|---|
| Allyl chloride | 79 |
| Benzyl chloride | 195 |
| Benzoyl chloride | 7,000 |
| Phenacyl chloride | 105,000 |
| Acetonyl chloride | 35,700 |

On the other hand, alkyl halides have reaction rates, relative to n-butyl chloride as 1, as follows:

| | |
|---|---|
| Ethyl chloride | 1.94 |
| n-Propyl chloride | 1.03 |
| n-Hexyl chloride | 1.22 |
| n-Octyl chloride | 1.32 |
| n-Dodecyl chloride | 1.00 |
| n-Hexadecyl chloride | 0.90 |
| Isopropyl chloride | 0.015 |
| Isobutyl chloride | 0.018 |
| 2-chloro-n-octane | 0.026 |
| 2-chloro-n-pentane | 0.048 |

From the above, it is obvious that alkyl halides are unactivated halides. As regards the saturated dihalogen compounds of this invention, the reactivity of such compounds resembles that of the alkyl halides in every way. (See Karrer, Organic Chemistry, 4th ed., 1950, page 242.) In general the dihaloalkanes give the ordinary reactions of the alkyl halides. However, the method of this invention has made a significant advance in the art, enabling the use of dihaloalkanes which were previously unusable due to their inherent unreactivity.

It has now been found that alkanediol esters of organic carboxylic acids can be prepared by a practical and commercially feasible method. Essentially, the method of this invention involves heating a dihaloalkane, an organic carboxylic acid and a tertiary amine. More specifically, the method of this invention involves heating a dihaloalkane, an organic carboxylic acid and a tertiary amine in molar quantities of the ratio of about 1:2:2. In order to obtain maximum yields of alkanediol esters of organic carboxylic acids by the method of this invention, it is preferable to conduct the reaction in the absence of water since, although the presence of some water will not render the reaction inoperative, it can cause a reduction in the maximum obtainable yield of ester.

Contrary to the teaching of the prior art, although a solvent may be employed, it is preferred to conduct the reaction without a solvent in order to obtain the maximum yield of desired ester. Lower yields usually result when inert materials are present with the reactants of this invention. Inert materials, such as solvents, do not prohibit utilization of the method of this invention but are considered as diluents to the reaction mixture.

The dihaloalkane reactant of this invention can be represented by $RX_2$, where R is a straight or branched chain alkylene radical containing up to 20 carbon atoms and X is a halogen atom, such as chlorine, bromine or iodine.

As illustrative of the dihaloalkane reactants of this invention are dichloromethane, dibromomethane, diiodomethane, 1,2-dichloroethane, 1,2-dibromoethane, 1,3-dibromopropane, 1,3-diiodopropane, 1-chloro-3-bromopropane, 1-iodo-3-chloropropane, 1,3-dichlorobutane, 2,3-dichlorobutane, 1,4 - dichlorobutane, 1,4 - diiodobutane, 1-bromo-4-chlorobutane, 1-indo-3-chlorobutane, 1-iodo-4-chlorobutane, erythro-2-chloro - 3-iodobutane, 1,3-dichloropentane, 1,4-dichloropentane, 1,5-dichloropentane, 1,5-dibromopentane, 2,3-dibromopentane, 1-bromo-5-chloropentane, 1-iodo-3-chloropentane, 1-iodo-4-chloropentane, 1-iodo-5-chloropentane, 1,1-dichloro-3-methylbutane, 1,3-dibromo - 2,2 - dimethylbutane, 1,6 - dichlorohexane, 1,2-dichlorohexane, 1,5-dichlorohexane, 1,2-dibromohexane, 1,4 - dibromohexane, 1,4 - diiodohexane, 1,6-dibromohexane, 1,6-diiodohexan, 2,3-dibromohexane, 2,5-dibromohexane, 3,4-dichlorohexane, 3,4-dibromohexane, 1,3-dibromo-2-methylpentane, 1,2-dibromo-3-methylpentane, 1,5-dibromo-3-methylpentane, 1,2-dibromo-4-methylpentane, 1,2-dichloro-3,3-dimethylbutane, 1,1-dichloroheptane, 1,4-dibromoheptane, 1,7-dibromoheptane, 1,7-dichloroheptane, 1,5-dichloro-3,3-dimethylpentane, 3-methyl-2,4-dibromohexane, 1,2-dichloro-3,4-dimethylpentane, 1,3-dibromo-2,2-diethylpropane, 1,8-dichloro-octane, 1,4-dibromo-octane, 1,8-dibromo-octane, 1,6-dichloro-octane, 1,7-dichloro-octane, 3-isopropyl-1,5-dibromopentane, 1,9-dichlorononane, 1,9-dibromononane, 1,2-dichlorononane, 1-chloro-9-iodononane, 1,10-dichlorodecane, 1,10-dibromodecane, 1,12-dichlorododecane, 1,12-dibromododecane, 1,14-dibromotetradecane, 1,18-dibromooctadecane, 1,18-dichlorooctadecane, 1,20-dibromoeicosane.

The organic carboxylic acid reactant of this invention can be any organic carboxylic acid. Non-limiting examples of such acids are saturated aliphatic monocarboxylic acids such as acetic, propionic, butyric, ethyl butyric, caproic, enanthic, caprylic, pelargonic, capric, undecanoic, lauric, myristic, palmitic, stearic, arachidic and the like, the unsaturated aliphatic monocarboxylic acids such as acrylic, methacrylic, crotonic, iso-crotonic, decylenic, palmitolic, oleic, linoleic and the like, the saturated aliphatic dicarboxylic acids such as oxalic, malonic, succinic, glutaric, adipic, pimelic, suberic, azelaic, sebacic and the like, the unsaturated aliphatic dicarboxylic acids such as maleic, fumaric, itaconic, citraconic, mesaconic and the like, aryl carboxylic acids such as benzoic acid, napthoic acid, phthalic acid, isophthalic acid, terephthalic acid, naphthalic acid, pyromelletic acid, toluic acids, and acid esters of polycarboxylic acids such as alkyl acid phthalates and the like, hydroxy carboxylic acids such as hydroxy acetic acid, β-hydroxy propionic acid, ethylidene lactic acid, hydroxy butyric acid, α-hydroxy isobutryric acid, hydroxy caproic acid, hydroxy stearic acid, tartronic acid, tartaric acid, malic acid, hydroxy benzoic acid and the like. Preferred acids of the aforementioned groups comprise the monocarboxylic acids containing from 2 to 18 carbon atoms and the dicarboxylic acids containing from 2 to 18 carbon atoms. The organic carboxylic acid reactant can be further characterized by the following general formula

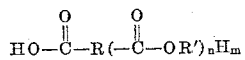

wherein $m$ and $n$ are unlike integers from zero to one, $R'$ is selected from the group consisting of hydrogen and alkyl, and $R$ is a divalent radical selected from the group consisting of saturated and olefinically unsaturated acyclic hydrocarbons, monocyclic and bicyclic aromatic hydrocarbons, and the monohydroxyl derivatives of said acyclic and aromatic hydrocarbons.

Where it is desired, the corresponding anhydride of any of the above acids, if available, may be employed in place of the acid per se.

Tertiary amines suitable for use in the process of this invention can be represented by the structure

wherein $R_1$, $R_2$ and $R_3$ are saturated aliphatic radicals. Preferably, $R_1$, $R_2$ and $R_3$ have a total of 3 to 24 carbon atoms, and it is also preferred that $R_1$, $R_2$ and $R_3$ be alkyl radicals. Non-limiting examples of such tertiary amines are trimethylamine, triethylamine, tri-n-propylamine, triisopropylamine, tri-n-butylamine, triisoamylamine, trihexylamine, triethanolamine, methyldiethylamine, trihexylamine, methyldiethanolamine, dimethylethylamine, dimethylcyclohexylamine, dimethylhexylamine, diethylhexylamine, dimethyldecylamine, and the like.

In carrying out the process of this invention it is preferred to add the tertiary amine and the dihaloalkane to the acid simultaneously. However, the amine and dihaloalkane can be mixed and then added to the acid, or added separately and in sequence. Further, the acid and halide can be added to the amine, etc. The temperature employed can be from about 50° C. to the reflux temperature of the system; however, it has been found that a temperature of 100° C. to 200° C. is usually satisfactory.

Illustrations of the process of this invention are given in the following examples. Parts are parts by weight unless otherwise stated.

*Example I*

To a suitable reaction vessel equipped with a thermometer, agitator and reflux condenser (the apparatus used throughout) were charged 178.0 parts of butyl acid phthalate, to which were added, with constant agitation, 83.0 parts of triethylamine and 35.6 parts of 1,2-dichloroethane as follows:

| Time (Minutes) | Temperature, ° C. | Remarks |
|---|---|---|
| 0 | 110 | Triethylamine addition begun. |
| 4 | 122 | 36% of triethylamine added. |
| 10 | 106 | 67% of triethylamine added; addition of triethylamine stopped. |
| 17 | 125 | Addition of 1,2-dichloroethane begun. |
| 25 | 137 | 58% of 1,2-dichloroethane added. |
| 27 | 138 | 72% of 1,2-dichloroethane added; addition of 1,2-dichloroethane stopped. |
| 37 | 146 | Addition of triethylamine resumed. |
| 44 | 122 | 86% of triethylamine added; triethylamine addition stopped. |
| 45 | 122 | 1,2-dichloroethane addition resumed. |
| 49 | 131 | All of 1,2-dichloroethane added. |
| 60 | 151 | Triethylamine addition resumed. |
| 78 | 146 | All of triethylamine added. |

Upon completion of the amine addition, the mass was heated to about 150° C. for about four hours and then cooled. Approximately 100 parts of water and 6 parts of hydrochloric acid were added thereto. The mass was separated into two layers. The organic layer was withdrawn and washed successively with water, aqueous sodium carbonate and water. The organic layer was steam sparged under vacuum, the organic layer was then washed with aqueous sodium carbonate and water and dried. The yield of 1,2-ethanediol bis(butyl phthalate) was 92.0%.

*Example II*

To the reaction vessel was charged 176.1 parts of 2-ethylhexyl acid adipate, to which were added, with constant agitation and while heating, 70.8 parts of triethylamine and 31.3 parts of 1,2-dichloroethane as follows:

| Time (Minutes) | Temperature, ° C. | Remarks |
|---|---|---|
| 0 | 24 | Triethylamine addition begun. |
| 3 | 50 | 46% triethylamine added. |
| 5 | 51 | 68% triethylamine added; amine addition stopped. |
| 7 | 73 | 1,3-dichloroethane addition begun. |
| 12 | 126 | 61% 1,2-dichloroethane added; 1,2-dichloroethane addition stopped. |
| 146 | 132 | Triethylamine addition resumed. |
| 169 | 123 | 88% triethylamine added; amine addition stopped; 1,2-dichloroethane addition resumed. |
| 192 | 123 | 73% 1,2-dichloroethane added. |
| 242 | 122 | All 1,2-dichloroethane added. |
| 285 | 125 | Triethylamine addition resumed. |
| 322 | 121 | All triethylamine added. |

Upon completion of the amine addition, the mass was heated at 150° C. for about 8 hours. The reaction mass was cooled and mixed with 100 parts of water and 12 parts of hydrochloric acid. The mass separated into two layers. The organic layer was withdrawn and washed successively with water, aqueous sodium hydroxide and water and then steam sparged under vacuum. The distillation residue was successively washed with aqueous sodium hydroxide and water and dried. The yield of 1,2-ethanediol bis(2-ethylhexyl adipate) was 72.4%.

Example III

To the reaction vessel was charged 111.1 parts of phthalic anhydride and 56.3 parts of n-butyl alcohol, to which was added, with constant agitation and while heating, 76.9 parts of triethylamine and 32.3 parts of dichloromethane as follows:

| Time (Minutes) | Temperature, °C. | Remarks |
|---|---|---|
| 0 | 103 | Triethylamine addition started. |
| 4 | 128 | 15% triethylamine added. |
| 7 | 130 | 39% triethylamine added; amine addition stopped. |
| 9 | 127 | Dichloromethane addition begun. |
| 17 | 152 | 20% dichloromethane added. |
| 32 | 147 | 35% dichloromethane added. |
| 107 | 141 | 53% dichloromethane added; dichloromethane addition stopped. |
| 242 | 141 | Triethylamine addition started. |
| 270 | 155 | 71% triethylamine added; amine addition stopped. |
| 272 | 149 | Dichloromethane addition resumed. |
| 282 | 147 | 72% dichloromethane added; dichloromethane addition stopped. |
| 301 | 126 | Triethylamine addition resumed. |
| 340 | 142 | 91% triethylamine added; triethyamine addition stopped. |
| 344 | 127 | Dichloromethane addition resumed. |
| 352 | 134 | 87% dichloromethane added. |
| 367 | 129 | All dichloromethane added. |
| 374 | 126 | Triethylamine addition resumed. |
| 402 | 132 | 95% triethylamine added. |
| 419 | 132 | All triethylamine added. |

Upon completion of the amine addition, the reaction mass was heated at about 150° C. for about 7 hours, cooled and mixed with 120 parts of water and 2½ parts of hydrochloric acid. The mass separated into two liquid layers. The organic layer was withdrawn and washed successively with water, aqueous sodium carbonate and water. The organic layer was then steam sparged under vacuum and dried. The yield of methanediol bis(butyl phthalate) was 72%.

Example IV

To the reaction vessel was charged 146.4 parts of capric acid and 92.0 parts of 1,5-dibromopentane. Thereafter, with agitation and while heating, 90.1 parts of triethylamine were added as follows:

| Time (Minutes) | Temperature, °C. | Remarks |
|---|---|---|
| 0 | 58 | Triethylamine addition begun. |
| 5 | 130 | Triethylamine all added. |

Upon completion of the amine addition, the mass was heated for about a half-hour at 165° C. and then cooled. Approximately 100 parts of water and 11 parts of hydrochloric acid were added thereto. The mass separated into two layers; the organic layer was withdrawn and washed successively with water and sodium hydroxide, then steam sparged under vacuum. The organic layer was then washed successively with aqueous sodium hydroxide and water. The yield of 1,5-pentanediol bis caprate was 87.5%.

Example V

To the reaction vessel was charged 120 parts of butyl acid phthalate. Thereafter, with agitation and while heating, 57.7 parts of triethylamine and 75.0 parts of 1,10-dibromodecane were added as follows:

| Time (Minutes) | Temperature, °C. | Remarks |
|---|---|---|
| 0 | 84 | Triethylamine and dibromodecane addition started. |
| 1 | 140 | All triethylamine added. |
| 4 | 144 | All dibromodecane added. |

Upon completion of the dibromodecane addition, the mass was heated for approximately fifteen minutes at a temperature of about 135° C. The reaction mass was cooled and approximately 90 parts of water and 6 parts of hydrochloric acid were added thereto with agitation. The mass separated into two liquid layers; the organic layer was withdrawn and washed successively with water, aqueous sodium hydroxide and water. The washed product was steam sparged under vacuum. The organic layer was then successively washed with aqueous sodium hydroxide and water. The yield of 1,10-decanediol bis(butyl phthalate) was 89.0%.

Example VI

In the manner of Example IV, 213.0 parts of lauric acid, 113.1 parts of triethylamine, and 63.5 parts of 1,4-dichlorobutane were utilized to prepare 193.0 parts of 1,4-butanediol bis laurate in an 85% yield based on the lauric acid.

Example VII

In the manner of Example IV, 242.0 parts of stearic acid, 89.0 parts of triethylamine, and 93.5 parts of 1-bromo-7-chloroheptane were utilized to prepare 223.6 parts of 1,7-heptanediol bis stearate in an 81.6% yield.

Example VIII

In the manner of Example I, 476.0 parts of butyl acid phthalate, 227.9 parts of triethylamine, and 141.1 parts of 1,4-dichloropentane were utilized to prepare 461.4 parts of 1,4-pentanediol bis(butyl phthalate) in a 90.5% yield.

Example IX

In the manner of Example I, 111.3 parts of butyl acid succinate, 67.9 parts of triethylamine, and 81.6 parts of 1,8-dibromo-octane were utilized to prepare 112.6 parts of 1,8-octanediol bis(butyl succinate) in a yield of 88.8% based on the butyl acid succinate.

Example X

In the manner of Example I, 240 parts of butyl acid phthalate, 113.1 parts of triethylamine, and 119.0 parts of 1,6-diiodohexane were utilized to prepare 228.6 parts of 1,6-hexanediol bis(butyl phthalate) in an 86.8% yield.

The dihaloalkane reactants which can be employed in the process of this invention may be charged as a substantially pure individual dihaloalkane, or they may be charged as a mixture of dihaloalkanes having an average weight corresponding to the weight of a particular dihaloalkane, as shown in some of the foregoing examples.

In addition to providing a new and improved esterification process for acids as discussed above, there is now provided, by the method of our invention, a process whereby hydroxy aliphatic acids can be esterified in high yield and without the formation of undesirable by-products. This aspect of our invention is, in and of itself, a considerable advance in the art due to the nature of hydroxy aliphatic acids. The dual function of these acids is very marked, for the hydroxyl and carboxyl groups show the usual properties of alcohols and acids. Thus, such acids form salts, esters and amides in the carboxyl group and undergo acetylation of the hydroxyl group in the usual manner. With certain reactants, such as phosphorus trichloride both functional groups enter into the reaction. In some reactions, the behavior of such acids depends upon the location of the hydroxyl group. In attempting to esterify hydroxy aliphatic acids, the problem of undesired side reactions is encountered due to this dual functionality. Thus, merely upon heating, the alpha-hydroxy acids yield lactides, the beta-hydroxy acids form unsaturated acids, the gamma-hydroxy and delta-hydroxy acids form lactones, and the epsilon-hydroxy acids (or others where the hydroxyl group is more remote from the carboxyl group) form unsaturated acids. Also, the formation of polyesters is quite possible, since many molecules of a hydroxy aliphatic acid can undergo mutual esterification.

By the method of our invention, however, the various undesired side reactions mentioned above are substantially eliminated, and hydroxy aliphatic acids can be esterified with dihaloalkanes to give high yields of desired esters. Thus, by the method of our invention, monohydroxy aliphatic acids, such as glycolic acid, lactic acid, beta-hydroxypropionic acid, malic acid and citric acid, as well as the dihydroxy aliphatic acids, such as tartaric acid, can now be readily esterified. Also, substituted hydroxy aliphatic acids, such as methylmercapto-alpha-hydroxybutyric acid and ethylmercapto-alpha-hydroxybutyric acid, can be esterified without affecting the various substituents previously added to a hydroxy aliphatic acid.

Many of the alkanediol esters prepared by the method of this invention are suitable for use as plasticizers for polyvinyl chloride resins. The term "polyvinyl chloride resins" includes polyvinyl chloride and copolymers of vinyl chloride. Examples of such polyvinyl chloride resins include polyvinyl chloride and copolymers of polyvinyl chloride with vinyl acetate, methyl methacrylate, diethyl maleate, dibutyl maleate and vinylidene chloride, particularly those copolymers containing at least 70% of combined vinyl chloride. Examples of the alkanediol esters prepared from dihaloalkanes by this invention and suitable for use as plasticizers for polyvinyl chloride resins are the phthalates and adipates, specific examples of which are 1,2-ethanediol bis(butyl phthalate), methanediol bis(butyl phthalate), 1,10-decanediol bis(butyl phthalate), 1,2-ethanediol bis(2-ethylhexyl adipate), 1,4-pentanediol bis(butyl phthalate), 1,10-decane bis(butyl phthalate) and 1,6-hexanediol bis(butyl phthalate). When employing these esters as plasticizers for polyvinyl chloride resins, they can be used at a concentration of from about 20 parts by weight to about 300 parts by weight per 100 parts by weight of polyvinyl chloride resin.

Non-limiting examples of polyvinyl chloride resins plasticized with some of the compounds prepared by the method of our invention are given below. In all cases the test sheet was a 40-mil sheet of polyvinyl chloride with a 40% plasticizer concentration. Parts are parts by weight.

*Example XI*

Approximately 100 parts of polyvinyl chloride were worked with approximately 66 parts of 1,2-ethanediol bis(butyl phthalate), prepared as in Example I, on a differential speed roll mill to prepare a plasticized polyvinyl chloride composition. Evaluation tests on a 40-mil sheet of said composition were run in accordance with the directions contained in the references hereinafter set forth, and the following results were observed:

| Low Temperature Flexibility Point, °C. | Volatility, Percent Loss |
|---|---|
| −9.4 | 2.9 |

*Example XII*

A plasticized polyvinyl chloride composition was prepared as in Example XI, using approximately 100 parts of polyvinyl chloride and approximately 66 parts of methanediol bis(butyl phthalate), prepared as in Example III. Evaluation tests on a 40-mil sheet were run in accordance with the directions contained in the references hereinafter set forth, and the following results were observed:

| Low Temperature Flexibility Point, °C. | Volatility, Percent Loss |
|---|---|
| −9.6 | 8.4 |

*Example XIII*

A plasticized polyvinyl chloride composition was prepared as in Example XI, using approximately 100 parts of polyvinyl chloride and approximately 66 parts of 1,2-ethanediol bis(2-ethylhexyl adipate), prepared as in Example II. Evaluation tests on a 40-mil sheet were run in accordance with the directions contained in the references hereinafter set forth, and the following results were observed:

| Low Temperature Flexibility Point, °C. | Volatility, Percent Loss |
|---|---|
| −49.8 | 6.1 |

*Example XIV*

A plasticized polyvinyl chloride composition was prepared as in Example XI, using approximately 100 parts of polyvinyl chloride and approximately 66 parts of the 1,10-decanediol bis(butyl phthalate), prepared as in Example V. Evaluation tests on a 40-mil sheet were run in accordance with the directions contained in the references hereinafter set forth, and the following results were observed:

| Low Temperature Flexibility Point, °C. | Volatility, Percent Loss |
|---|---|
| −16.8 | 1.12 |

The methods used to determine the properties shown in Examples XI to XIV were as follows:

| Property | Method |
|---|---|
| Low Temperature Flexibility | Clash and Berg, Ind. and Engr. Chem., Vol. 34, p. 1218. |
| Volatility | ASTM D1203-52T. |

Replacing triethylamine in the foregoing examples with an equimolar amount of a different tertiary amine and as tri-n-butylamine, triethanolamine, trimethylamine, dimethylethylamine, tri-n-propylamine, triisobutylamine, dimethylcyclohexylamine, dimethylbenzylamine, and the like, produces substantially the same results. In the process of this invention, the tertiary amine is recovered in substantially quantitative amounts upon neutralizing the tertiary amine hydrohalide by-product which is obtained from the reaction mass in the form of an aqueous solution thereof, e.g., the water washes.

Also, in the case of polycarboxylic acids, acid esters may be further esterified and therefore utilized in the method of this invention. Furthermore, a mixture of a polycarboxylic acid anhydride and an alcohol can be charged and the mixture heated in the presence of the tertiary amine, and simultaneously or thereafter, in the presence of the dihaloalkane reactant. In the appended claims, therefore, it is to be understood that the acid reactant may be either the acid per se, an acid ester of an organic polycarboxylic acid, or a polycarboxylic acid anhydride with a sufficient amount of alcohol to form an acid ester. Thus, the invention is applicable to any organic compound containing at least one COOH group. If acids containing more than one COOH group are used, polyesters are formed.

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A method for the preparation of an ester of an organic carboxylic acid of the formula

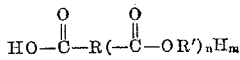

wherein $m$ and $n$ are unlike integers from zero to one, R' is selected from the group consisting of hydrogen and alkyl, and R is a divalent radical selected from the group consisting of saturated and olefinically unsaturated acyclic hydrocarbons, monocyclic and bicyclic aromatic hydrocarbons, and the monohydroxyl derivatives of said acyclic and aromatic hydrocarbons, said method comprising reacting about one mol proportion of a dihaloalkane containing from 1 to 20 carbon atoms, the halogen of said dihaloalkane being selected from the group consisting of chlorine, bromine and iodine, about two mol proportions of a trialkylamine containing a total of 3 to 24 carbon atoms, and about two mol proportions of the organic carboxylic acid to be esterified.

2. A method of claim 1 wherein the trialkylamine is triethylamine.

3. A method for the preparation of alkanediol bis(butyl phthalate) comprising reacting one mol proportion of dihaloalkane containing from 1 to 20 carbon atoms, the halogen of said dihaloalkane being selected from the group consisting of chlorine, bromine and iodine, about two mol proportions of a trialkylamine containing a total of 3 to 24 carbon atoms and about two mol proportions of butyl acid phthalate.

4. A method of claim 3 wherein the dihaloalkane is dibromoalkane.

5. A method for the preparation of 1,2-ethanediol bis-(butyl phthalate) comprising reacting one mol proportion of 1,2-dichloroethane, about two mol proportions of triethylamine and about two mol proportions of butyl acid phthalate.

6. A method for the preparation of 1,2-ethanediol bis-(2-ethylhexyl adipate) comprising reacting one mol proportion of 1,2-dichloroethane, about two mol proportions of triethylamine and about two mol proportions of 2-ethylhexyl acid adipate.

7. A method for the preparation of methanediol bis-(butyl phthalate) comprising reacting one mol proportion of dichloromethane, about two mol proportions of triethylamine and about two mol proportions of butyl acid phthalate.

8. A method for the preparation of 1,5-pentanediol bis caprate comprising reacting one mol proportion of 1,5-dibromopentane, about two mol proportions of triethylamine, and about two mol proportions of capric acid.

9. A method for the preparation of 1,10-decanediol bis-(butyl phthalate) comprising reacting one mol proportion of 1,10-dibromodecane, about two mol proportions of triethylamine and about two mol proportions of butyl acid phthalate.

References Cited in the file of this patent

UNITED STATES PATENTS

| | | |
|---|---|---|
| 2,991,297 | Cooley et al. | July 4, 1961 |
| 2,997,493 | Huber | Aug. 22, 1961 |
| 3,023,185 | Bartlett et al. | Feb. 27, 1962 |
| 3,043,791 | Martin et al. | July 10, 1962 |